US009892871B2

(12) United States Patent
Yoo et al.

(10) Patent No.: US 9,892,871 B2
(45) Date of Patent: Feb. 13, 2018

(54) BLOCK-TYPE SUPERCAPACITORS AND FABRICATING METHOD FOR THE SAME, GRAPHENE OXIDE-METAL OXIDE COMPOSITE AND SYNTHESIZING METHOD FOR THE COMPOSITE

(71) Applicant: Korea Institute of Energy Research, Daejeon (KR)

(72) Inventors: Jung-Joon Yoo, Daejeon (KR); Chan-Woo Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 238 days.

(21) Appl. No.: 14/549,902

(22) Filed: Nov. 21, 2014

(65) Prior Publication Data
US 2016/0133395 A1   May 12, 2016

(30) Foreign Application Priority Data
Nov. 11, 2014   (KR) .......................... 10-2014-0156324

(51) Int. Cl.
*H01G 11/30* (2013.01)
*H01G 11/86* (2013.01)
(Continued)

(52) U.S. Cl.
CPC ............. *H01G 11/86* (2013.01); *H01G 11/26* (2013.01); *H01G 11/30* (2013.01); *H01G 11/36* (2013.01); *Y02E 60/13* (2013.01)

(58) Field of Classification Search
CPC ........ H01G 11/28; H01G 11/04; H01G 11/32; H01G 11/42; H01G 11/34; H01G 11/44; H01G 11/46
See application file for complete search history.

(56) References Cited

U.S. PATENT DOCUMENTS 6,762,926 B1 * 7/2004 Shiue ...................... H01G 4/32
                                                        361/502
8,098,482 B2 * 1/2012 Clelland ................ H01G 11/12
                                                        361/502
(Continued)

FOREIGN PATENT DOCUMENTS

KR    1020110058223 A    6/2011
KR    1020120030367 A    3/2012
(Continued)

OTHER PUBLICATIONS

Wang et al., Ternary Self-Assembly of Ordered Metal Oxide-Graphene Nanocomposites for Electrochemical Energy Storage, ACNano, vol. 4, No. 3, published online Feb. 25, 2010, pp. 1587-1595.
(Continued)

*Primary Examiner* — Nguyen Ha
(74) *Attorney, Agent, or Firm* — Westman, Champlin & Koehler, P.A.; Amanda M. Prose

(57) ABSTRACT

Disclosed is a block supercapacitor, including two or more unit cells configured such that electrodes having a layered structure are disposed to face each other in an in-plane structure, wherein the two or more unit cells comprises an electrode arranged adjacent to each other respectively and the electrodes adjacent to each other are connected in series. As the unit cells are connected in series, a high-voltage supercapacitor can be provided.

15 Claims, 17 Drawing Sheets

(51) Int. Cl.
*H01G 11/26* (2013.01)
*H01G 11/36* (2013.01)

(56) References Cited

U.S. PATENT DOCUMENTS

| | | | | |
|---|---|---|---|---|
| 8,206,469 | B2* | 6/2012 | Chiang | G02F 1/1523 204/554 |
| 9,349,543 | B2* | 5/2016 | Lyon | H01G 11/36 |
| 2002/0114128 | A1* | 8/2002 | Ryu | H01G 9/025 361/508 |
| 2010/0190047 | A1* | 7/2010 | West | H01M 2/08 429/156 |
| 2011/0183180 | A1* | 7/2011 | Yu | H01G 11/36 429/128 |
| 2013/0286544 | A1* | 10/2013 | Azais | H01G 9/008 361/502 |

FOREIGN PATENT DOCUMENTS

| | | |
|---|---|---|
| KR | 1020130081090 A | 7/2013 |
| KR | 101356791 B1 | 1/2014 |
| WO | 2014097015 A1 | 6/2014 |

OTHER PUBLICATIONS

T. Chen and L. Dai, 'Flexiable supercapacitors based on carbon nanomaterials,' Journal of Materials Chemistry A, 2014, 2, 10756-10775 (First published online Feb. 26, 2014).

L. Wang et al., 'Composite structure and properties of $Mn_3O_4$/graphene oxide and $Mn_3O_4$/graphene,' Journal of Materials Chemistry A, 2013, 1, 8385-8397 (Published on the web: Apr. 19, 2013).

X. Wang et al., 'A $SnO_2$/graphene composite as a high stability electrode for lithium ion batteries,' Carbon, 49 (2011) 133-139 (Published on the web: Sep. 7, 2010).

Office Action issued for related Korean Patent Application No. 10-2014-0156324, dated Aug. 28, 2015.

Office Action issued for related Korean Patent Application No. 10-2015-0135602, dated Nov. 26, 2015.

* cited by examiner

US 9,892,871 B2

BLOCK-TYPE SUPERCAPACITORS AND FABRICATING METHOD FOR THE SAME, GRAPHENE OXIDE-METAL OXIDE COMPOSITE AND SYNTHESIZING METHOD FOR THE COMPOSITE

BACKGROUND OF THE INVENTION

1. Field of the Invention

The present invention relates to a block supercapacitor, a manufacturing method thereof, a composite as an electrode material thereof, and a method of preparing the same. More particularly, the present invention relates to a block supercapacitor having an in-plane structure with improved performance, a manufacturing method thereof, a composite suitable for use as an electrode material thereof, and a method of preparing the composite.

2. Description of the Related Art

Typically, a supercapacitor, which is also referred to as an electric double layer capacitor (EDLC) or an ultra-capacitor, is an energy storage device using a charging phenomenon based on a surface chemical reaction or simple ion movement to an interface between an electrode and an electrolyte, unlike batteries based on chemical reactions.

Specifically, a supercapacitor is composed of electrodes attached to conductors and an electrolyte solution incorporated therein, and employs a pair of charge layers having opposite polarities (an electric double layer) formed at the electrode interface. Such a supercapacitor enables quick charge/discharge and exhibits high charge/discharge efficiency. Furthermore, the supercapacitor manifests semi-permanent cycle life properties, without the need for repair due to very low degradation by the repetition of charge/discharge operations. Hence, the supercapacitor may be utilized as an auxiliary battery or an alternative to batteries and is thus receiving attention as a next-generation energy storage device.

The capacitance of the supercapacitor is determined by the charge amount accumulated in the electric double layer. The larger the electrode surface area, the higher the charge amount. A commercially available supercapacitor is composed mainly of activated carbon electrodes. To obtain higher power storage capacity, thorough research is ongoing into novel electrode materials. An example of such an electrode material is graphene.

Graphene refers to a carbon structure made up of a two-dimensional (2D) nanosheet single layer of carbon atoms arranged in hexagonal honeycomb lattices, and is regarded as a promising electrode material because of very large specific surface area per volume and outstanding electronic conductivity. However, graphene electrodes developed to date for use in supercapacitors are manufactured in such a manner that a mixture including graphene and graphene oxide is pressed or graphene ink is dropped onto carbon electrodes and then dried, and thus the structural features of graphene are not used properly.

PRIOR ART DOCUMENT

[Patent Document 1] Korean Patent No. 10-1079317
[Patent Document 2] Korean Patent No. 10-1352089

SUMMARY OF THE INVENTION

Accordingly, the present invention has been made keeping in mind the above problems encountered in the related art, and an object of the present invention is to provide a block supercapacitor having an in-plane structure with improved performance, a manufacturing method thereof, a composite suitable for use as an electrode material thereof, and a method of preparing the composite.

In order to accomplish the above object, an aspect of the present invention provides a block supercapacitor, comprising two or more unit cells configured such that electrodes having a layered structure are disposed to face each other in an in-plane structure, wherein the two or more unit cells comprises an electrode arranged adjacent to each other respectively and the electrodes adjacent to each other are connected in series.

As used herein, the in-plane structure refers to a structure configured such that an electrolyte is provided adjacent to the side surfaces (that is, the exposed portion of laminated layers) of electrodes having a layered structure in which materials having a 2D planar shape such as graphene or graphene oxide are laminated. Such an in-plane structure may be formed by separating the electrode member via the formation of a pattern in a direction perpendicular to the array direction of individual layers of the electrode member having a layered structure.

As such, a connector comprising a metal material may be formed between the electrodes arranged adjacent to each other so that the electrodes are connected in series. Furthermore, a metal is preferably loaded between the electrodes arranged adjacent to each other, thus forming a metal wall.

The electrodes having a layered structure preferably comprise any one or a mixture of two or more selected from among a carbon material, a metal oxide, a metal nitride, a metal sulfide, a conductive organic material, graphene, and graphene oxide.

Two electrodes of each of the unit cells may be separated via patterning in any one shape selected from among an interdigitated shape, a straight shape, and a zigzag shape. The electrode shape is not limited so long as the electrodes have an in-plane structure.

Another aspect of the present invention provides a method of manufacturing the supercapacitor, comprising: forming an electrode member on the surface of a substrate; separating the electrode member into two or more cell members; forming a connector comprising a metal material in a space between the cell members; and separating each of the separated cell members into two electrodes, thus forming unit cells, wherein the electrode member has a layered structure, the unit cells are formed such that the electrodes having a layered structure are disposed to face each other in an in-plane structure, and the electrodes of the unit cells adjacent to each other are electrically connected in series by the connector.

The method may further comprise filling a space between the cell members with a metal thus forming a metal wall, after forming the connector. As such, forming the metal wall may be performed using any one process selected from among a plating process such as electroplating, thin film deposition, screen printing, casting, and film/plate/block attachment.

The method may further comprise forming an epoxy polymer coating for covering the electrode member, before separating the electrode member into the cell members.

The method may further comprise forming current collectors at both sides of the electrode member, after forming the electrode member. As such, forming the current collectors may be performed using any one process selected from among thin film deposition, plating, screen printing, casting, and film/plate/block attachment. Also, reinforcing contact portions between the electrode member and the current collectors via metal plating may be further carried out.

The method may further comprise placing an electrolyte between the electrodes of the unit cells. As such, the electrolyte may comprise any one or a mixture of two or more selected from among a liquid electrolyte, a solid electrolyte, and a gel electrolyte.

Forming the unit cells may be performed by patterning the cell members using any one process selected from among optical patterning, mechanical patterning, chemical etching, and imprinting, thus forming two separated electrodes.

The method may further comprise chemically reducing the separated electrodes of the unit cells. As such, chemically reducing the separated electrodes may be performed using any one process selected from among exposure to a reducing gas, immersion in a reducing agent-containing aqueous solution, thermal treatment, microwave (electromagnetic wave) treatment, and optical treatment.

The method may further comprise introducing a functional group to the separated electrodes of the unit cells to obtain a pseudocapacitive effect. As such, introducing the functional group may be performed by subjecting the separated electrodes to any one process selected from among immersion in a KOH solution, plasma treatment, optical treatment using a laser or UV light, and chemical synthesis.

Still another aspect of the present invention provides a composite for use in electrodes of the supercapacitor as above, comprising graphene oxide and metal oxide configured such that graphene oxide layers are laminated into a layered structure and metal oxide nanoparticles are dispersed between the graphene oxide layers of the layered structure.

As the metal oxide nanoparticles are uniformly dispersed in the graphene oxide layered structure adapted to manufacture the supercapacitor having an in-plane structure, performance of the supercapacitor may be improved. As such, the metal oxide nanoparticles dispersed between the graphene oxide layers may comprise $SnO_2$ or $Mn_3O_4$.

Yet another aspect of the present invention provides a method of preparing the composite, comprising: preparing a graphene oxide solution; preparing a metal oxide precursor solution; mixing the graphene oxide solution with the metal oxide precursor solution; filtering the mixed solution via vacuum filtration using a membrane filter; thermally treating a filtered material.

The layered structure of graphene oxide layers may be obtained by means of a vacuum filtration process. When the metal oxide precursor solution is used together, metal oxide is synthesized to the functional group of graphene oxide and thus metal oxide nanoparticles are uniformly dispersed.

In order to uniformly disperse the metal oxide nanoparticles, the metal oxide precursor solution is preferably added dropwise to the graphene oxide solution.

To compound Sn oxide nanoparticles, the metal oxide precursor solution may include a Sn oxide precursor solution obtained by dissolving $SnCl_2 \cdot 2H_2O$ in HCl.

To compound Mn oxide nanoparticles, the metal oxide precursor solution may include a Mn oxide precursor solution comprising a $MnCl_2 \cdot 4H_2O$ aqueous solution and a $KMnO_4$ aqueous solution. As such, mixing may be performed by sequentially adding the $MnCl_2 \cdot 4H_2O$ aqueous solution and the $KMnO_4$ aqueous solution to the graphene oxide solution.

According to the present invention, a high-voltage supercapacitor can be provided by connecting unit cells in series.

Moreover, a thick electrode member can be formed by increasing the amount of an electrode material and the amount of an electrolyte to be accommodated, thus increasing the capacity of the supercapacitor.

Furthermore, a graphene oxide-metal oxide composite has a layered structure adapted for formation of electrodes in an in-plane structure. Hence, since metal oxide nanoparticles are uniformly dispersed between graphene oxide layers, performance of the resulting supercapacitor can be enhanced.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, a detailed description will be given of embodiments of the present invention, with reference to the appended drawings.

FIGS. 1 to 7 schematically illustrate a process of manufacturing a supercapacitor according to an embodiment of the present invention.

Figure 1:
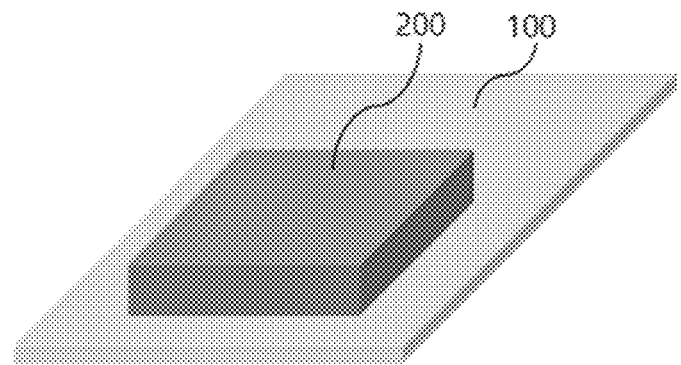
FIGS. 1 to 6 schematically illustrate a process of manufacturing a supercapacitor according to an embodiment of the present invention.

As illustrated in FIG. 1, an electrode member 200 having a layered structure is attached onto a slide glass substrate 100. The electrode member 200 has a layered structure configured such that 2D planar unit materials are laminated, and individual layers thereof are arranged parallel to the surface of the substrate 100. This typically results from forming the layered structure on the surface of the substrate 100. When the electrode member 200, which is separately manufactured, is attached to the substrate 100, individual layers of the layered structure have to be disposed parallel to the substrate 100.

In the present embodiment, the electrode member 200 having a layered structure is made using graphene and graphene oxide having a representative 2D planar structure, cut to a size of 10 mm×10 mm using a UV laser drilling system, and then attached to the surface of the substrate 100 using epoxy.

Graphene oxide may be prepared by chemical exfoliation of graphite. In this embodiment, in order to manufacture an electrode member having a layered structure using graphene oxide, 20 mg of chemically exfoliated graphene oxide is added to 10 cc of deionized water and then dispersed via sonication using a sonicator for 30 min, giving a graphene oxide solution. The graphene oxide solution is then filtered using a vacuum filtration device equipped with a Durapore membrane filter. The formation of graphene oxide into the electrode member having a layered structure may be performed using self-laminating assembly, chemical vapor deposition, casting, or coating, in addition to the vacuum filtration process. The filtered electrode member is reduced via thermal treatment at 200° C. Although the electrode member used in this embodiment may be manufactured to have a micrometer sized thickness, it may be formed thickly to the range of millimeter or centimeter so as to increase its capacity. In order to form a thick electrode member (a kind of block electrode member), vacuum filtration, electrophoretic plating, chemical vapor deposition, casting or coating has to be carried out for a longer period of time, or the solvent of the graphene or graphene oxide solution has to be evaporated and then rolled or pressed. Thereby, the thick electrode member made of graphene or graphene oxide with a rectangular parallelepiped or cube shape may be formed. As such, a binder material may be partially added to increase mechanical stability of the electrode member.

Figure 2:
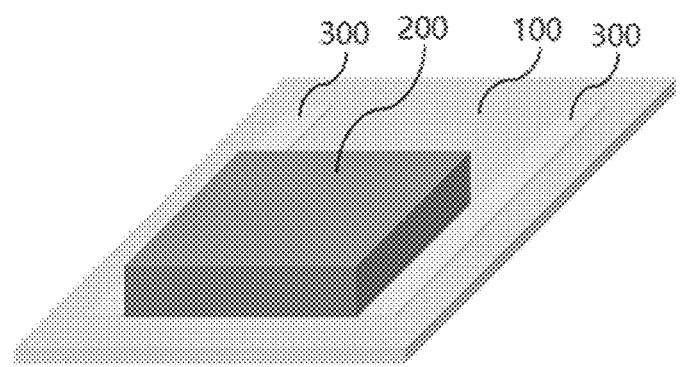

Next, as illustrated in FIG. 2, current collectors 300 are formed at both sides of the electrode member 200.

In this embodiment, the current collectors 300 are formed by sequentially sputtering titanium having a thickness of 200 nm or less and gold having a thickness of 700 nm or less, and a mask is used such that the current collectors 300 come into contact with both sides of the electrode member 200. Such current collectors may be formed via a thin film deposition process such as chemical vapor deposition or thermal deposition, or a plating process such as electroplating, electroless plating or electrophoretic plating. In addition thereto, a variety of processes, such as screen printing, casting, film/plate/film attachment, etc., may be applied.

Figure 3:
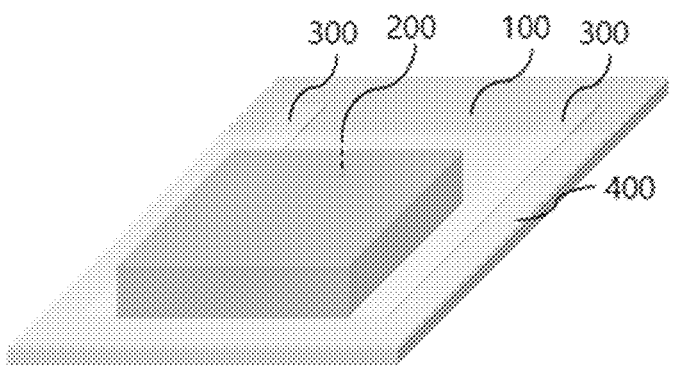

Next, as illustrated in FIG. 3, an epoxy coating 400 is formed so as to cover the electrode member 200 and the current collectors 300.

The epoxy coating 400 is formed so as to completely cover the electrode member 200 and the current collectors 300, with the exception of the end for electrical connection to the outside. By the epoxy coating 400, an electrolyte may be stably accommodated in the subsequent procedures, and also, direct contact between the electrolyte and the current collectors 300 may be prevented.

Figure 4:
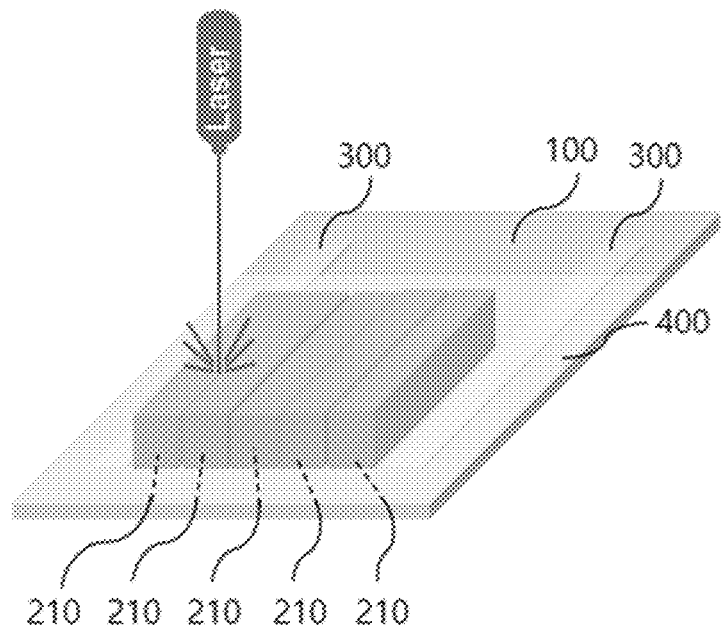

Next, as illustrated in FIG. 4, the electrode member 200 is separated into five cell members 210 using a laser.

In this embodiment, the electrode member 200 is separated using a UV laser drilling system, thereby providing five cell members 210, which will be subsequently formed into independent unit cells. Alternatively, the electrode member 200 may be separated using UV lithography for a semiconductor process, a mechanical patterning process using a cutter, a laser process, or an imprinting process.

Also, to electrically connect the cell members 210 in series, connectors (not shown) are formed between the cell members. In this embodiment, a mask is formed, after which titanium and gold are sequentially sputtered only on the surface of the substrate exposed between the cell members 210 so that the separated cell members are electrically connected. Such connectors may be formed using a thin film deposition process such as chemical vapor deposition or thermal deposition, or a plating process such as electroplating, electroless plating or electrophoretic plating. In addition thereto, a variety of processes, such as screen printing, casting, film/plate/block attachment, etc., may be applied, depending on the spaces between the cell members.

Also, in this embodiment, the epoxy coating is removed from both side surfaces of the electrode member 200 having the current collectors 300 using a UV laser drilling system. Furthermore, sputtering is performed on the side surfaces of the cell members exposed in the course of forming the connectors, and thereby electrical connection between the cell members 210 and the current collectors 300 may become stable and the connection resistance may decrease.

Figure 5:
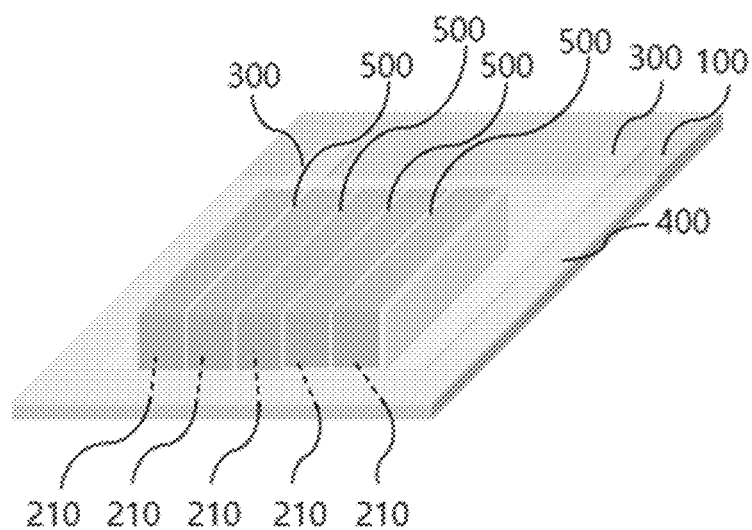

Next, as illustrated in FIG. 5, nickel is loaded between the cell members 210, thus forming metal walls 500.

The metal walls 500 are formed by inserting a metal to enhance the connection between the cell members 210 and the current collectors formed therebetween and to decrease the series resistance between unit cells that will be subsequently formed. In this embodiment, nickel is adopted so that an electroplating process is easily applied to fill the spaces between the cell members with a metal, but the present invention is not limited thereto and any metal having low electric resistance such as gold may be used. Useful as the counter electrode for electroplating is stainless steel, and electroplating is performed using a plating solution prepared by dissolving 330 g/L nickel sulfate, 45 g/L nickel chloride and 38 g/L boric acid in distilled water. The portion other than the plating portion is masked with a tape, and the cell members are immersed in the plating solution, whereby nickel plating is carried out at 55° C. for 20 min at a current density of 20 mA/cm². The metal walls 500 between the cell members 210 play a role in preventing the electrolyte placed in the unit cells that will be subsequently formed from penetrating into the neighboring unit cells. The formation of such metal walls is not limited to electroplating or the other plating processes, and may be implemented by a variety of processes, such as thin film deposition, screen printing, casting, film/plate/block attachment, etc.

On the other hand, a nickel plating layer is formed on the side surfaces subjected to sputtering after removal of the epoxy coating in the above separation process. The nickel plating layer formed on the side walls is effective at enhancing the connections between the cell members and the current collectors and lowering the connection resistance.

Figure 6:
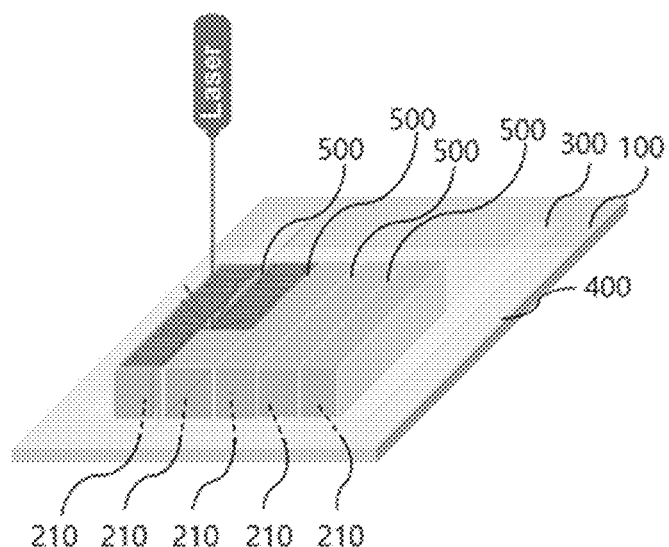
Figure 7:
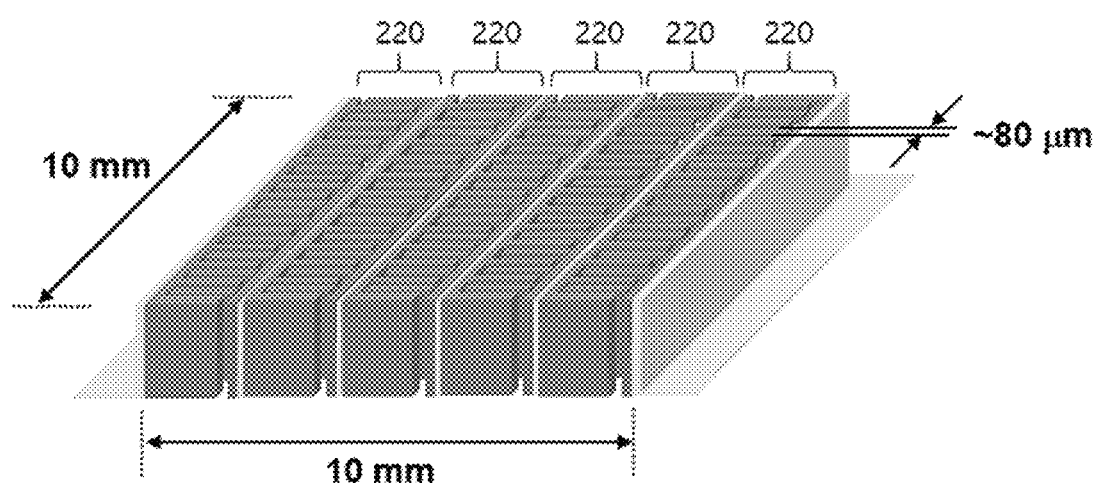
FIG. 7 illustrates the structure of a supercapacitor according to an embodiment of the present invention.

As illustrated in FIG. 6, the spaces having a width of 20 µm or less between the cell members 210 are patterned in a predetermined form, thus forming unit cells each having two separated electrodes. FIG. 7 illustrates the structure of a supercapacitor according to the present embodiment. Individual unit cells 220 of the supercapacitor according to this embodiment are connected in series by the adjacent unit cells, the lower current collectors (not shown) and the nickel metal walls 500 therebetween.

In this embodiment, an interdigitated pattern is formed using a UV laser drilling system. The illustrated shape is adopted to enlarge the surface area of the electrodes, but the shape of the pattern is not limited thereto so long as two separated electrodes are formed. Alternatively, the formation of electrodes by separating the cell members 210 may be performed using UV lithography for a semiconductor process, a mechanical patterning process using a cutter, a laser process, or an imprinting process. When a graphene oxide material is used for electrodes, it may be reduced into conductive graphene.

As mentioned above, individual layers of the layered structure of graphene or graphene oxide that constitutes the cell members 210 are disposed parallel to the substrate 100. Since the cell members 210 having a layered structure are separated in a direction perpendicular to the top to form spaces therebetween, the facing surfaces at spaces therebetween have an in-plane structure in which laminated individual layers are exposed. In this embodiment, the layered structure arranged parallel to the surface of the substrate 100 is patterned in a direction perpendicular to the surface of the substrate 100 to form the spaces therebetween, thereby yielding a pair of electrodes having an in-plane structure and facilitating the approach of electrolyte ions into the layers of the electrodes.

Even when individual layers of the layered structure are disposed in a direction perpendicular to the substrate, unlike the present embodiment, patterning may be performed in a direction perpendicular to the surface of the substrate so long as individual layers are disposed in a direction perpendicular to the line for separating the current collectors and the cells, thereby forming an in-plane structure.

The in-plane structure may function to enhance performance of the supercapacitor by an edge effect on the cut section. Graphite has capacity varying depending on the array direction, and the effect where a capacity in an edge plane direction is about 10 times greater than that in a basal plane direction is referred to as an edge effect. Such an edge effect is considered to be due to combinations of semiconductor properties of graphite in a direction perpendicular to the basal plane, metal-like behavior thereof in the edge plane direction, etc. Since the cut section of the electrodes having an in-plane structure corresponds to the edge plane direction, the supercapacitor according to the present embodiment having electrodes in an in-plane structure may exhibit excellent performance.

When the electrodes are formed via patterning of the cell members using a laser cutting process, the facing surfaces of the electrodes are cut sections and thus include cutting defects. Such defects may cause pseudocapacitive effects, thus imparting an additional capacity to the supercapacitor.

As the electrode member becomes thicker, the ratio of the cut sections relative to the total electrodes is increasing, and thereby edge effects and pseudocapacitive effects may become more significant. Hence, when the electrode member in an in-plane structure as in the present embodiment is thicker, a greater capacity may result.

The edge effects and the pseudocapacitive effects may result from formation of the electrodes by separating the electrode member or the cell members using a cutting process. Such effects may become greater in the in-plane structure as in the present embodiment, but are not limited only to the in-plane structure. Even when the electrode member is made using an electrode material such as spherical activated carbon, the cut sections of the electrodes have edge plane and surface defects due to the cutting process, thus ensuring the edge effects and the pseudocapacitive effects.

Additionally reducing the electrodes thus obtained or introducing a functional group to the electrodes may be further performed.

When graphene oxide is used as the electrode material as in this embodiment, an additional reducing process following the aforementioned reducing process may decrease the electrode resistance to thus increase power. The additional reducing process is carried out in such a manner that the supercapacitor resulting from separation of the electrode member or electrodes is placed together with 5 cc of hydrazine monohydrate (98%, Aldrich) in a vacuum desiccator for 48 hr to thus chemically reduce the graphene oxide. Alternatively, various reducing processes, such as a reducing process in an aqueous solution phase via immersion in a solution containing a reducing agent, a gas reducing process via flow of a reducing gas, or a reducing process via thermal treatment, may be applied.

The electrodes may be introduced with a functional group in such a manner that the supercapacitor resulting from separation of the electrode member or electrodes is immersed in a KOH solution, or undergoes plasma treatment, optical treatment using laser or UV light, or chemical synthesis. Because of such a functional group, pseudocapacitive effects are additionally imparted, thereby enhancing the performance of the supercapacitor.

Finally, the spaces between the separated electrodes of the unit cells 220 are filled with an electrolyte and packaged, thus completing a supercapacitor. Examples of the electrolyte used in the supercapacitor according to the present embodiment may include liquid electrolytes such as aqueous electrolytes, organic electrolytes and ionic liquid electrolytes, solid electrolytes, and gel electrolytes, which may be used without limitation or in combination. The packaging or housing process for preventing the outflow of the electrolyte may be implemented using any process without limitation, and a detailed description thereof is omitted.

Figure 8:
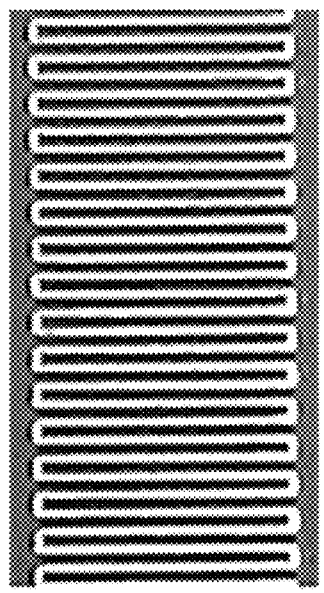
FIG. 8 illustrates an image for the electrode portion of the unit cell of the supercapacitor according to the embodiment of the present invention.
Figure 9:
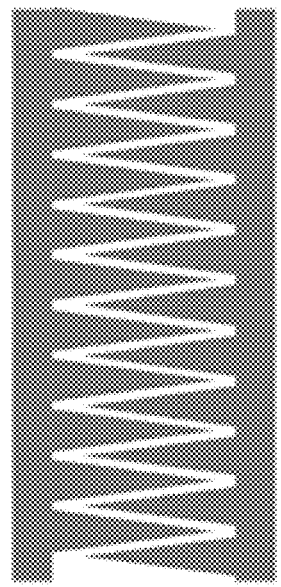
FIGS. 9 and 10 schematically illustrate modifications of an electrode separation pattern.
Figure 10:
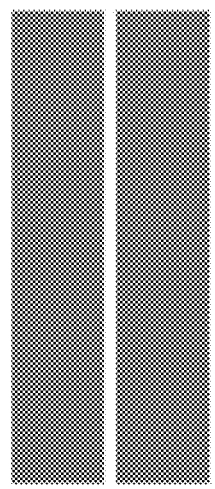

FIG. 8 illustrates the electrode portion of the unit cell of the supercapacitor according to the present embodiment, and FIGS. 9 and 10 schematically illustrate modifications of the electrode separation pattern.

In this embodiment as mentioned above, the surface area of electrodes is enlarged by forming an interdigitated pattern of the protruding branches of electrodes. The electrode separation pattern is not limited thereto, and may be provided in zigzag form or straight form as illustrated in the drawings. Even when the other electrode separation pattern is applied, the facing surfaces of the electrodes have an in-plane structure, in which the laminated structure of layers is exposed.

The manufacturing method of the block supercapacitor and the structure thereof according to embodiments of the present invention are described above. The block supercapacitor according to the present invention is configured such that unit cells having an in-plane structure are connected in series to thereby obtain high voltage, and the height thereof is increased to the extent of millimeter or centimeter, ultimately increasing the capacity of the supercapacitor.

Below is a description of a hybrid electrode material of graphene oxide and metal oxide, suitable for use in electrodes of the block supercapacitor, and a method of preparing the same.

As mentioned above, the block supercapacitor is manufactured using an electrode material having a layered structure so as to have an in-plane structure. The electrode material is typically exemplified by graphene oxide. In order to improve the properties of graphene oxide, attempts are made to mix graphene oxide with another nano-material, but aggregation of particles between graphenes may be caused by the added material. The aggregation of particles may incur concentration of stress, undesirably deteriorating the bonding strength between graphene layers, making it difficult to form a thick layered structure. Also, the addition of a surfactant is disclosed to solve the aggregation problems (Wang et al., ACS Nano, Vol 4, No 3, 1587-1595 2010), but it is difficult to remove the surfactant used.

The present invention addresses a method of synthesizing a nano composite of graphene oxide and metal oxide in the form of a thin film in which nanoparticles are uniformly distributed, in the absence of external heat and pressure, without the additional use of an additive such as a surfactant.

1) Preparation of Graphene Oxide Solution

A graphene oxide solution is first prepared. Specifically, 10 mg of graphene oxide chemically exfoliated from graphite as mentioned above is added to 10 mL of deionized water, and dispersed via sonication using a sonicator for 30 min, giving a graphene oxide solution.

In the case where graphene oxide is not uniformly dispersed in the solution, stress concentration may occur on the non-dispersed graphene oxide pieces. Hence, sufficient dispersion via sonication is required.

2) Preparation of Metal Oxide Precursor Solution

Then, a metal oxide precursor solution is prepared. In this embodiment, a Sn oxide precursor solution and a Mn oxide precursor solution were prepared.

The Sn oxide precursor solution was prepared by adding 10 mg of $SnCl_2 \cdot 2H_2O$ (98%, Aldrich) to 10 mL of a 0.02 M HCl (36% in water) solution and performing stirring at 800 rpm for about 1 hr.

The Mn oxide precursor solution was prepared in two kinds by adding 11 mg of $MnCl_2 \cdot 4H_2O$ (98%, Aldrich) to 10 mL of deionzied water and performing stirring for 1 hr, giving a solution (A), and adding 7 mg of $KMnO_4$ (98%, Aldrich) to 10 mL of deionized water and performing stirring for 1 hr, giving a solution (B).

In the case where the salt is not completely dissolved during the preparation of the metal oxide precursor solution, the non-dissolved large particles may be attached to graphene oxide to thus incur stress concentration. Hence, complete dissolution via stirring is required.

3) Preparation of Graphene Oxide-Metal Oxide Composite 3-1) Preparation of Graphene Oxide-Sn Oxide Composite While the Sn oxide precursor solution is slowly added dropwise to the graphene oxide solution, stirring is conducted at 800 rpm for 15 min. As such, the ratio of the graphene oxide solution to the Sn oxide precursor solution is equal to or less than 1:1.5. If the amount of the Sn oxide precursor solution exceeds the upper limit, stress concentration may occur due to aggregation of Sn oxide.

The mixed solution is filtered using a vacuum filtration device equipped with a Durapore membrane filter. The filtered material is reduced by two-step thermal treatment at 150° C. and 200° C. for 30 min each.

3-2) Preparation of Graphene Oxide-Mn Oxide Composite

While the Mn oxide precursor solution (A) is slowly added dropwise to the graphene oxide solution, stirring is conducted at 800 rpm for 15 min. Subsequently, while the Mn oxide precursor solution (B) is slowly added dropwise, stirring is further conducted for 15 min. When Mn oxide is mixed, there is no stress concentration problem due to the mixing ratio.

The mixed solution is filtered using a vacuum filtration device equipped with a Durapore membrane filter. The filtered material is reduced by two-step thermal treatment at 150° C. and 200° C. for 30 min each. Also, thermal treatment is further performed at higher temperatures of 300° C. and 350° C. to evaluate the crystallinity of Mn oxide.

Analysis of Microstructure and Properties of Graphene Oxide-Sn Oxide Composite ($SnO_2$-GO)

Figure 11:
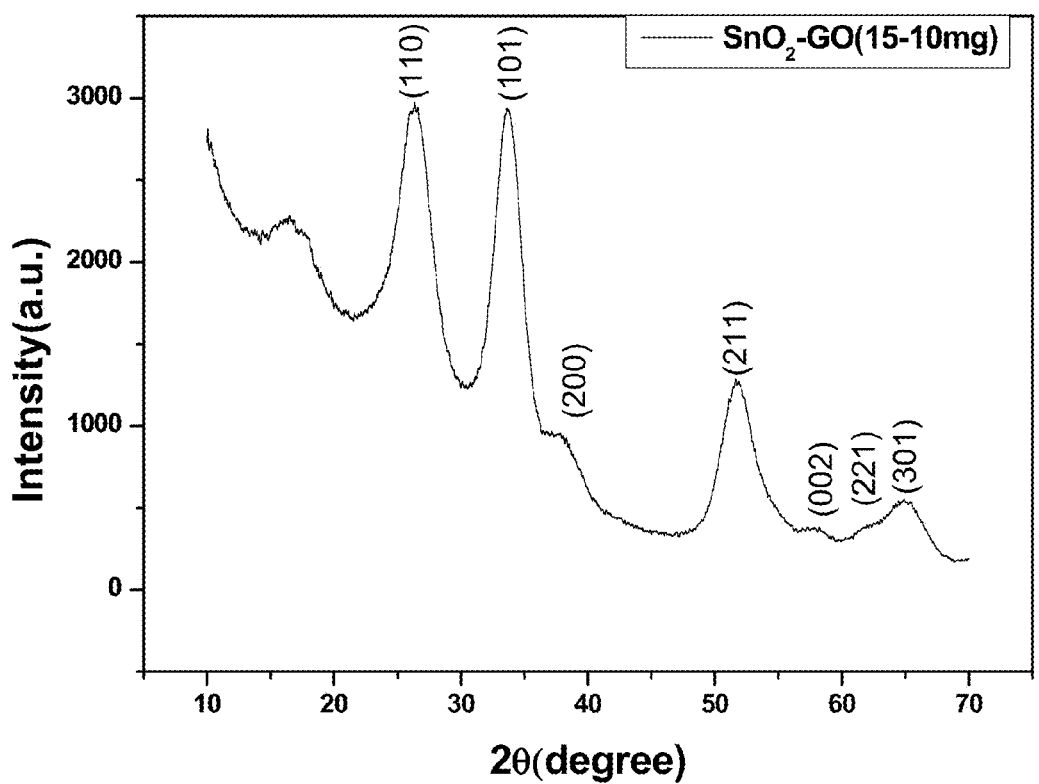
FIG. 11 illustrates the results of analysis of X-ray diffraction (XRD) of a $SnO_2$-GO composite prepared according to an embodiment of the present invention.

FIG. 11 illustrates the results of XRD analysis of the $SnO_2$-GO composite according to the present embodiment.

As illustrated in this drawing, the peak corresponding to the interfacial index of $SnO_2$ is observed and thus $SnO_2$ can be confirmed to be contained. Also, based on the calculation equation (Scherrer's equation), the particle size corresponding to (110) peak was measured to be about 4.6 nm.

Figure 12:
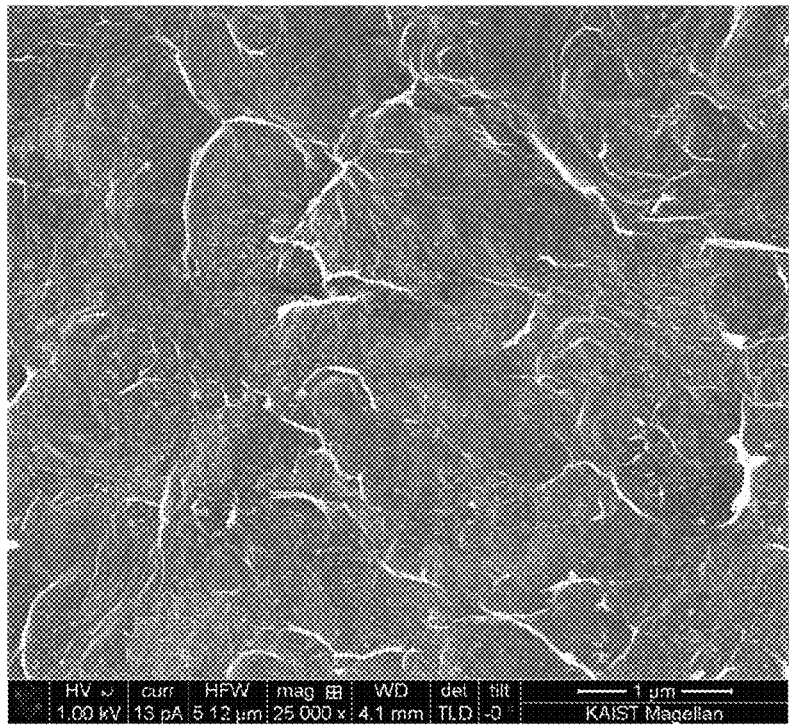
FIG. 12 illustrates a scanning electron microscope (SEM) image for the surface of the $SnO_2$-GO composite.
Figure 13:
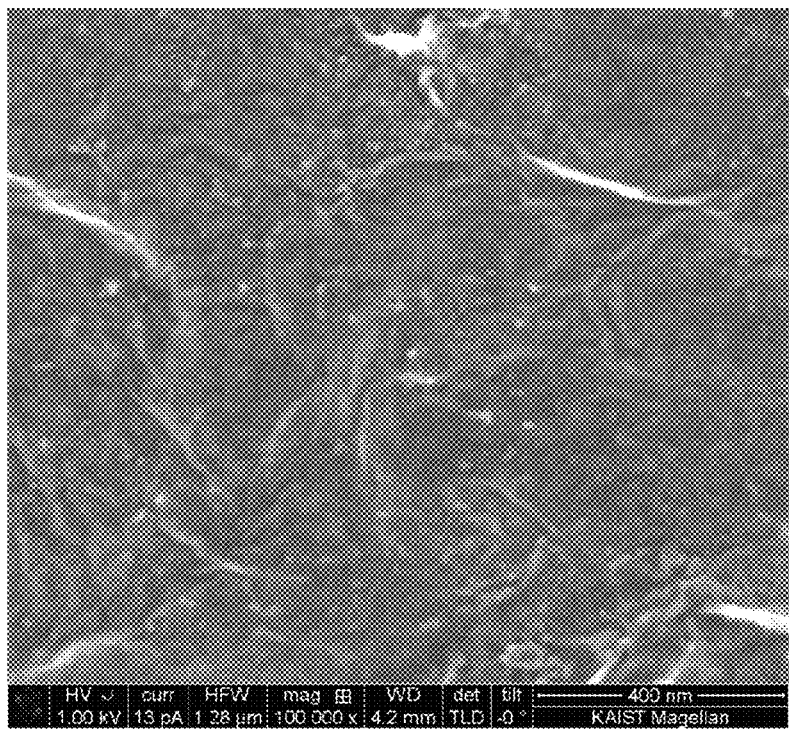
FIG. 13 illustrates an enlarged image of a portion of FIG. 12.

FIG. 12 illustrates an SEM image for the surface of the $SnO_2$-GO composite according to the present embodiment, and FIG. 13 illustrates an enlarged image of a portion of FIG. 12.

As illustrated in these drawings, the particles are distributed on the surface of the $SnO_2$-GO composite, unlike the surface of typical graphene oxide. As is apparent from the enlarged image, the size of the particles positioned on the surface of the composite is determined to be ones of nm. Taking into consideration the results of XRD analysis together, the above particles are estimated to be $SnO_2$.

Figure 14:
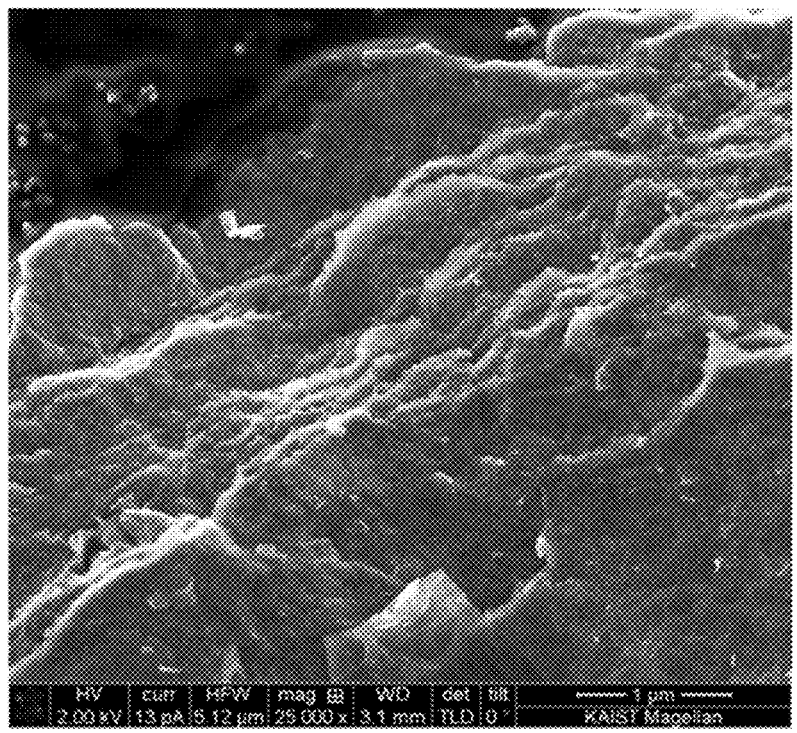
FIG. 14 illustrates an SEM image for the section resulting from attaching and then peeling a tape to and from the surface of the $SnO_2$-GO composite.
Figure 15:
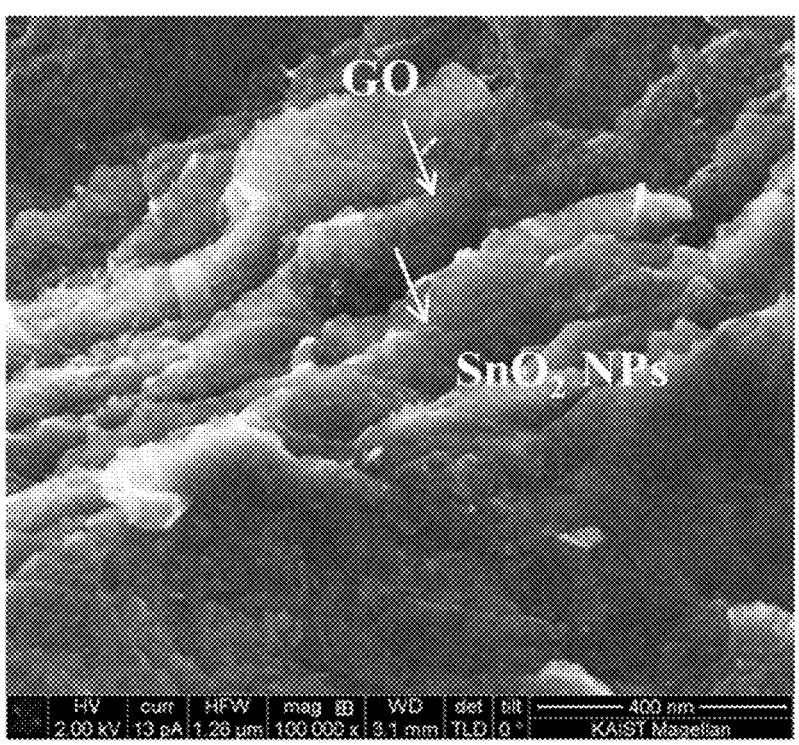
FIG. 15 illustrates an enlarged image of a portion of FIG. 14.

FIG. 14 illustrates an SEM image for the section resulting from attaching and then peeling a tape to and from the surface of the $SnO_2$-GO composite according to the present embodiment, and FIG. 15 illustrates an enlarged image of a portion of FIG. 14.

From this, it can be seen that the composite has a layered structure due to graphene oxide, and $SnO_2$ particles are present between graphene oxide layers, as well as the surface thereof.

Figure 16:
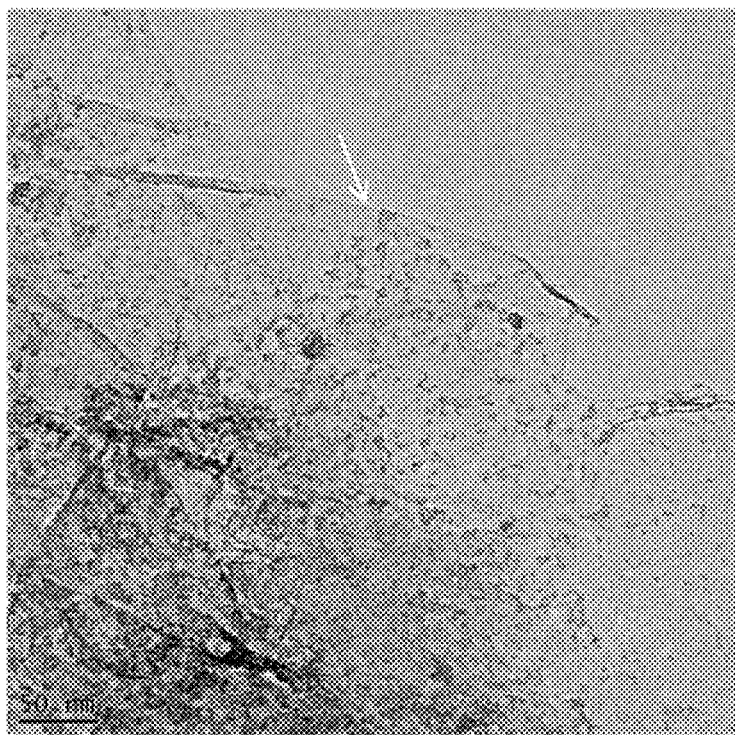
FIG. 16 illustrates a transmission electrode microscope (TEM) image for the surface of the $SnO_2$-GO composite.
Figure 17:
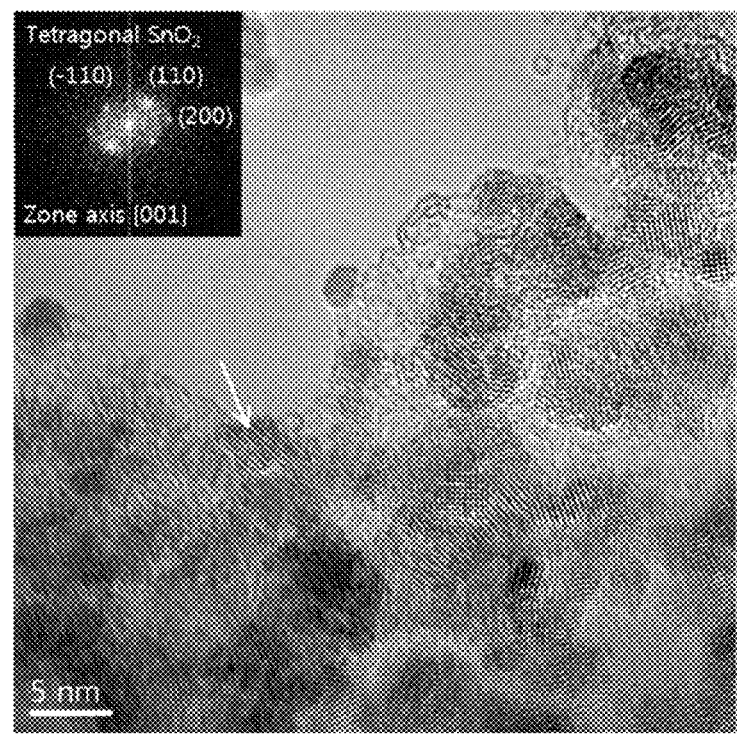
FIG. 17 illustrates a TEM image for the surface of the $SnO_2$-GO composite at higher magnification.

FIG. 16 illustrates a TEM image for the surface of the $SnO_2$-GO composite according to the present embodiment, and FIG. 17 illustrates a TEM image for the surface thereof at higher magnification.

The arrow shown in FIG. 16 indicates a graphene oxide layer, which means that $SnO_2$ particles are dispersed. The $SnO_2$ particles represented in the enlarged image of FIG. 17 are distributed on the graphene oxide layer. Through the indexing results inserted into FIG. 17, the particles are determined to be $SnO_2$ as analyzed by XRD, and the particle size is distributed in the range of 3-6 nm, which is consistent with the results of XRD.

Figure 18:
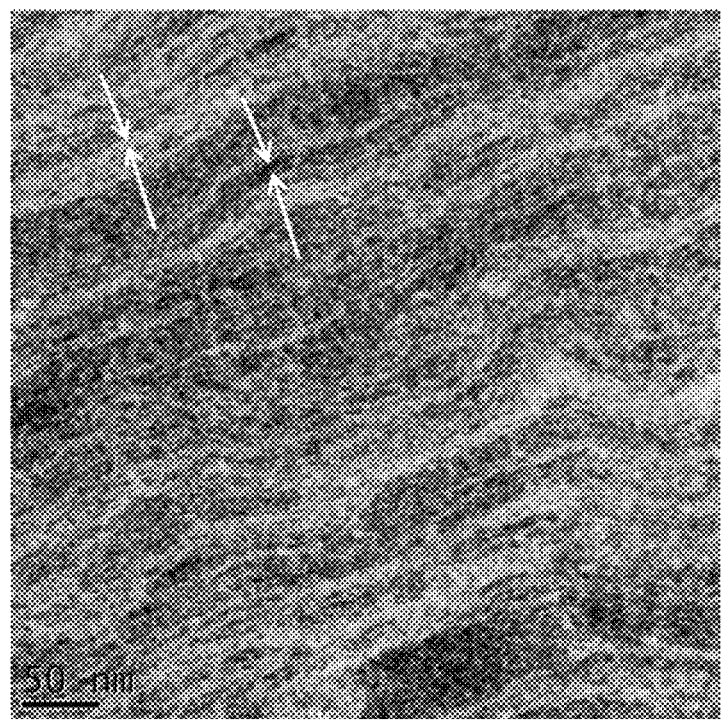
FIG. 18 illustrates a TEM image for the cross-section of the $SnO_2$-GO composite.
Figure 19:
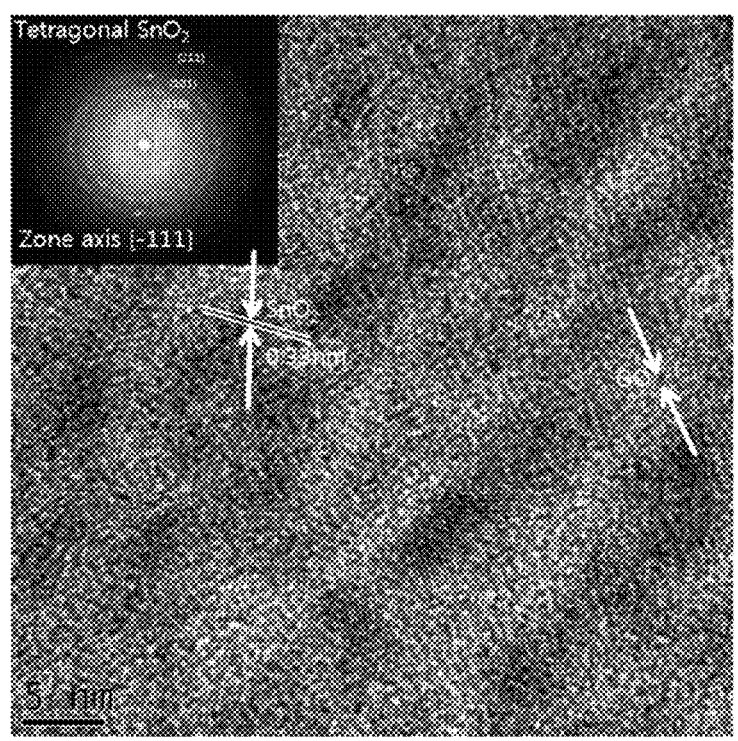
FIG. 19 illustrates a TEM image for the cross-section of the $SnO_2$-GO composite at higher magnification.

FIG. 18 illustrates a TEM image for the cross-section of the $SnO_2$-GO composite according to the present embodiment, and FIG. 19 illustrates a TEM image for the cross-section thereof at higher magnification.

In FIG. 18, the left arrow indicates the graphene oxide layer, and the right arrow indicates $SnO_2$, from which $SnO_2$ is uniformly distributed between the graphene oxide layers. In FIG. 19, the left arrow indicates $SnO_2$, and the right arrow indicates the graphene oxide layer. Through the indexing results inserted into FIG. 19, the particles are determined to be $SnO_2$.

Analysis of Microstructure and Properties of Graphene Oxide-Mn Oxide Composite ($Mn_3O_4$-GO)

Figure 20:
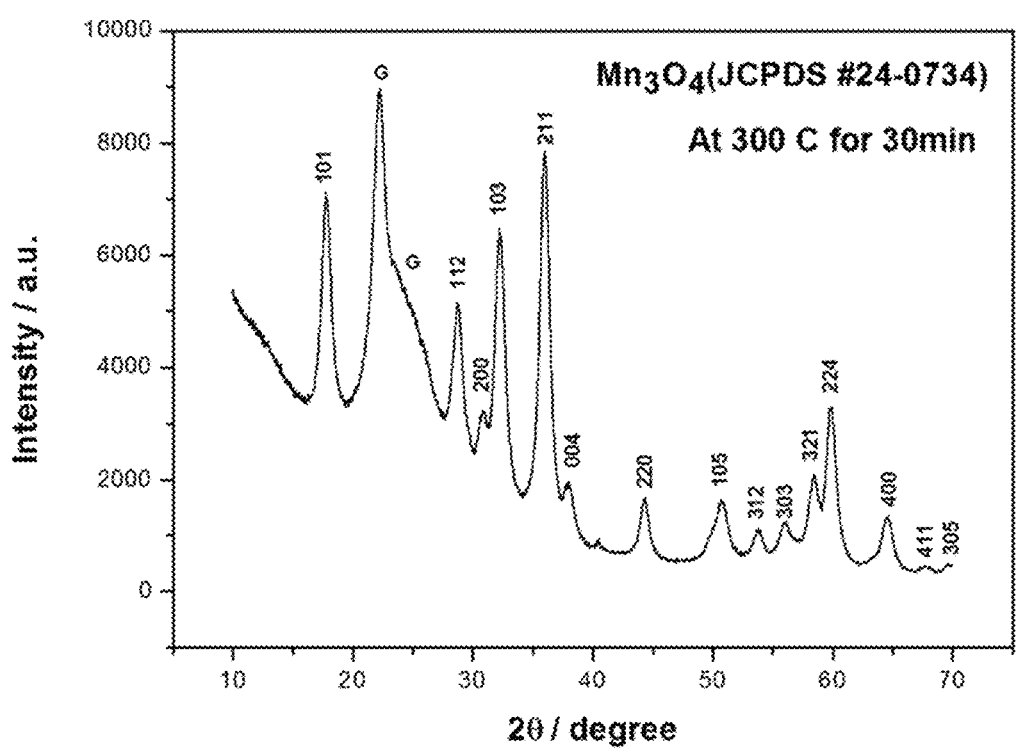
FIG. 20 illustrates the results of analysis of XRD of a $Mn_3O_4$-GO composite prepared according to an embodiment of the present invention.

FIG. 20 illustrates the results of XRD analysis of the $Mn_3O_4$-GO composite according to the present embodiment.

As illustrated in this drawing, the peak corresponding to the interfacial index of $Mn_3O_4$ is observed and thus $Mn_3O_4$ can be seen to be contained. FIG. 20 illustrates the results of XRD of the sample subjected to thermal treatment at 300° C. for 30 min. When the thermal treatment temperature was increased to 350° C., the crystallinity of $Mn_3O_4$ was further enhanced.

Figure 21:
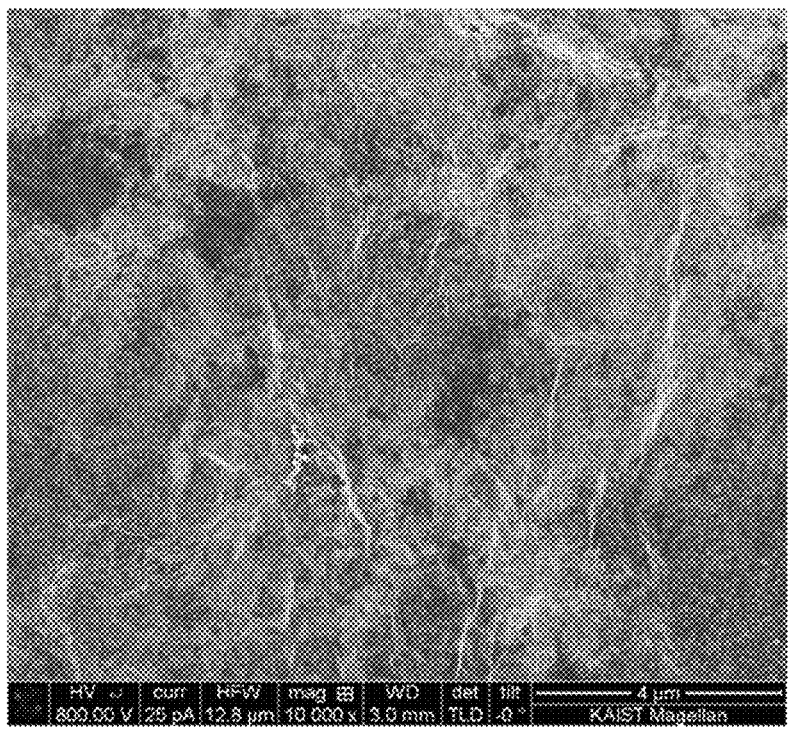
FIG. 21 illustrates an SEM image for the surface of the $Mn_3O_4$-GO composite.
Figure 22:
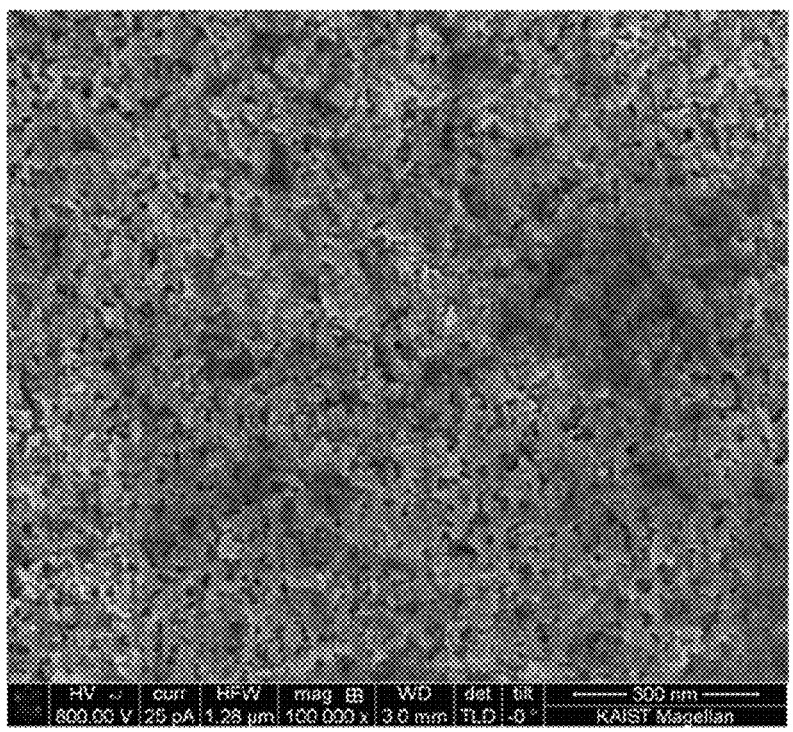
FIG. 22 illustrates an enlarged image of a portion of FIG. 21.

FIG. 21 illustrates an SEM image for the surface of the $Mn_3O_4$-GO composite according to the present embodiment, and FIG. 22 illustrates an enlarged image of a portion of FIG. 21.

As illustrated in these drawings, the particles are distributed on the surface of the $Mn_3O_4$-GO composite, unlike the surface of typical graphene oxide. As is apparent from the enlarged image, the particles are connected in a network type so as to cover almost the entire surface, and the size of the particles is determined to be tens of nm. Taking into consideration the results of XRD of FIG. 20, such particles are estimated to be $Mn_3O_4$.

Figure 23:
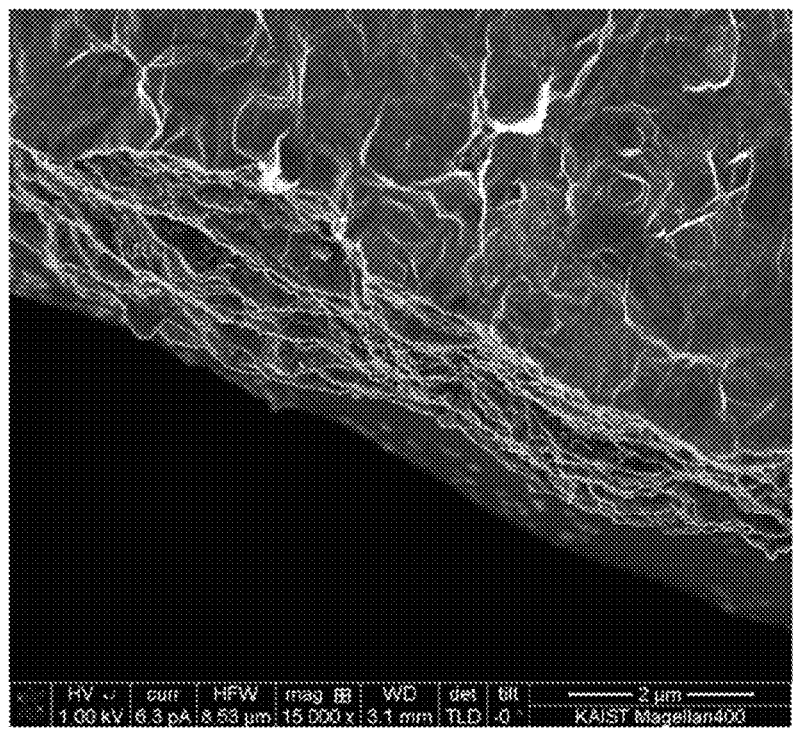
FIG. 23 illustrates an SEM image for the section resulting from attaching and then peeling a tape to and from the surface of the $Mn_3O_4$-GO composite.
Figure 24:
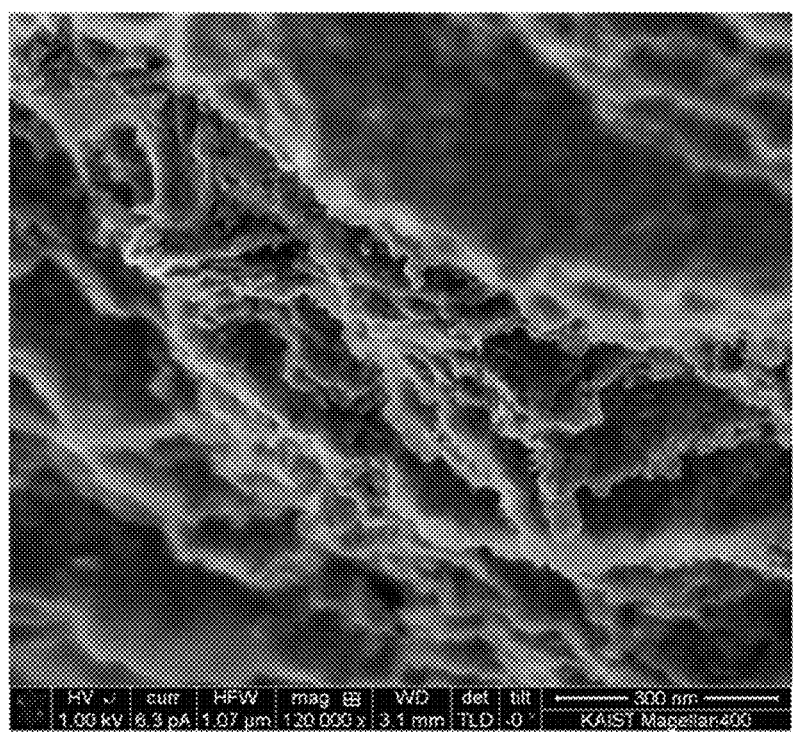
FIG. 24 illustrates an enlarged image of a portion of FIG. 23.

FIG. 23 illustrates an SEM image for the section resulting from attaching and then peeling a tape to and from the surface of the $Mn_3O_4$-GO composite according to the present embodiment, and FIG. 24 illustrates an enlarged image of a portion of FIG. 23.

From this, it can be seen that the composite has a layered structure due to graphene oxide, and $Mn_3O_4$ particles are present between the graphene oxide layers, as well as the surface thereof.

Figure 25:
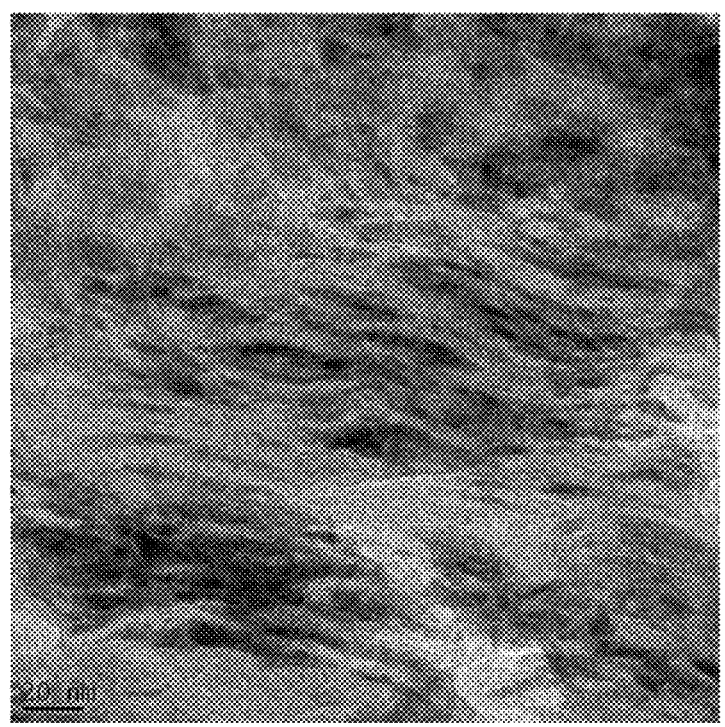
FIG. 25 illustrates a TEM image for the cross-section of the $Mn_3O_4$-GO composite.
Figure 26:
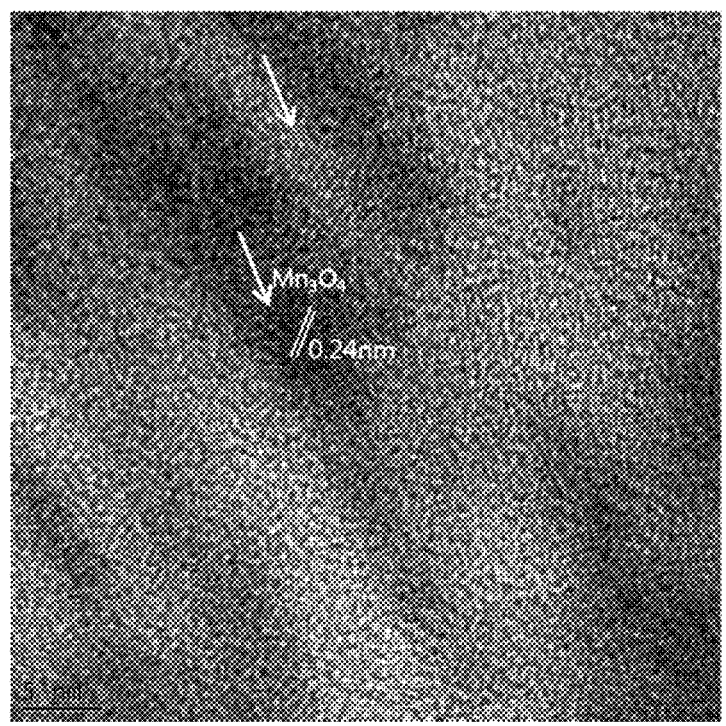
FIG. 26 illustrates a TEM image for the cross-section of the $Mn_3O_4$-GO composite at higher magnification.

FIG. 25 illustrates a TEM image for the cross-section of the $Mn_3O_4$-GO composite according to the present embodiment, and FIG. 26 illustrates a TEM image for the cross-section thereof at higher magnification.

The pale portion represented by the upper arrow of FIG. 26 indicates a graphene oxide layer, and the dark portion represented by the lower arrow indicates $Mn_3O_4$ particles. Thus, $Mn_3O_4$ particles are distributed in the form of a film between the graphene oxide layers and the space between the graphene oxide layers becomes large due to the $Mn_3O_4$ particles.

Analysis of Electrochemical Properties

In order to evaluate the electrochemical properties of the prepared composite, a supercapacitor according to the above embodiment was manufactured. For accurate evaluation, a supercapacitor composed of a single unit cell was manufactured. To this end, the prepared composite was cut to a size of 2 mm×10 mm, patterned using a UV laser drilling system, and then placed in a vacuum desiccator containing 5 cc of hydrazine monohydrate (98%, Aldrich) and thus chemically reduced for 48 hr.

The electrochemical behavior of the supercapacitor was analyzed using cyclic voltammetry (CV). The specific capacitance (SC) was determined through the area of I-V curve, and the CV curve of each device was measured at a scan rate of 10~1000 mV/s.

Figure 27:
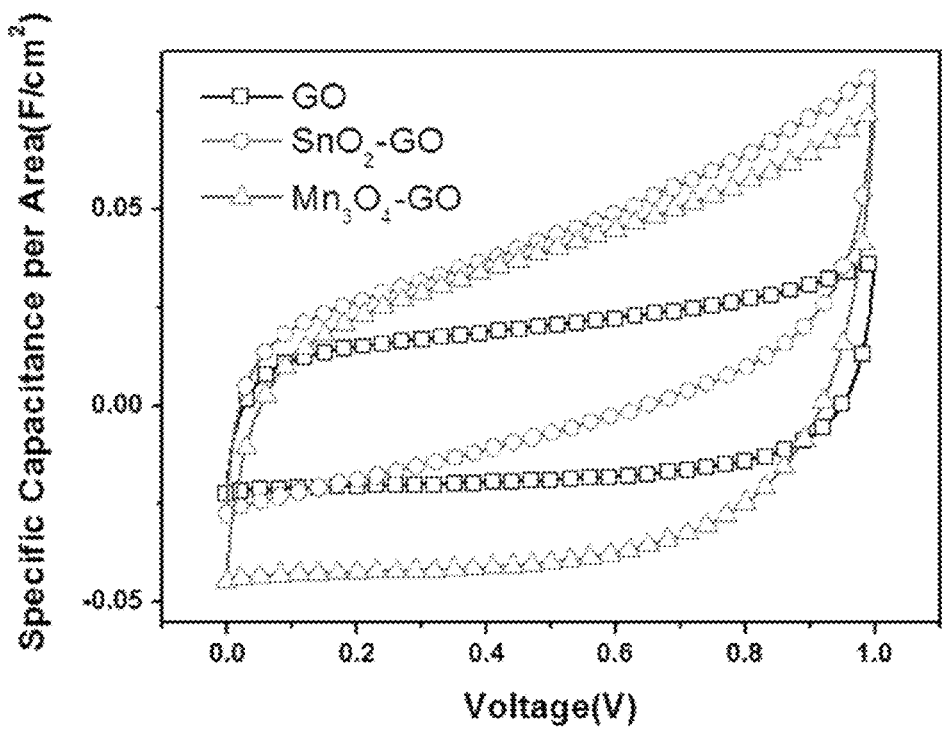
FIG. 27 illustrates a graph for cyclic voltammetry (CV) behavior of supercapacitor devices of Example and Comparative Example.

FIG. 27 illustrates a graph for the CV behavior of the supercapacitor devices of Example and Comparative Example.

This drawing shows the specific capacitance (SC) per the same area. The SC value was increased when using the composite electrode according to the present embodiment, compared to when using a conventional graphene oxide (GO) electrode. Also, the SC value per area was increased about 2.5 times in the presence of $Mn_3O_4$ particles, rather than $SnO_2$ particles.

Figure 28:
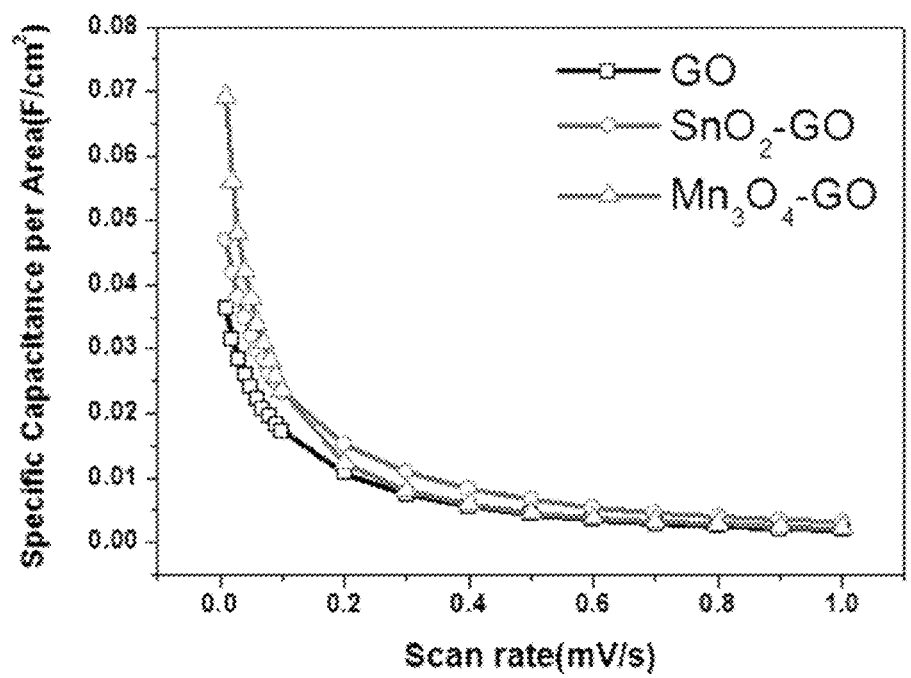
FIG. 28 illustrates a graph for changes in specific capacitance (SC) values per area depending on an increase in a scan rate.

FIG. 28 illustrates a graph for changes in SC value per area depending on an increase in the scan rate.

At a scan rate of 0.1 V/s or less, the device made of $Mn_3O_4$ exhibited superior properties, rather than the device made of $SnO_2$. On the other hand, at 0.1 V/s or more, the SC properties of the device made of $SnO_2$ became better.

Figure 29:
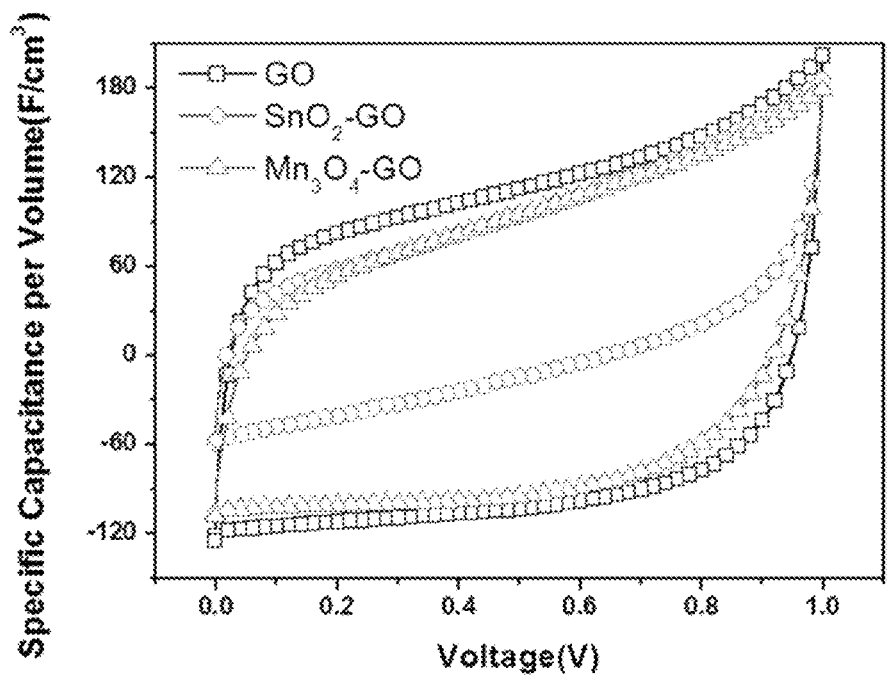
FIG. 29 illustrates a graph for SC values per weight of the devices of Example and Comparative Example.

FIG. 29 illustrates a graph for SC value per weight of the manufactured device.

Since the weight of synthesized Sn oxide or Mn oxide nanoparticles is greater than that of graphene oxide in the same amount, an increase in SC value per weight cannot be expected. Likewise the SC value per area as above, the properties of the device made of Mn oxide rather than Sn oxide became superior.

Figure 30:
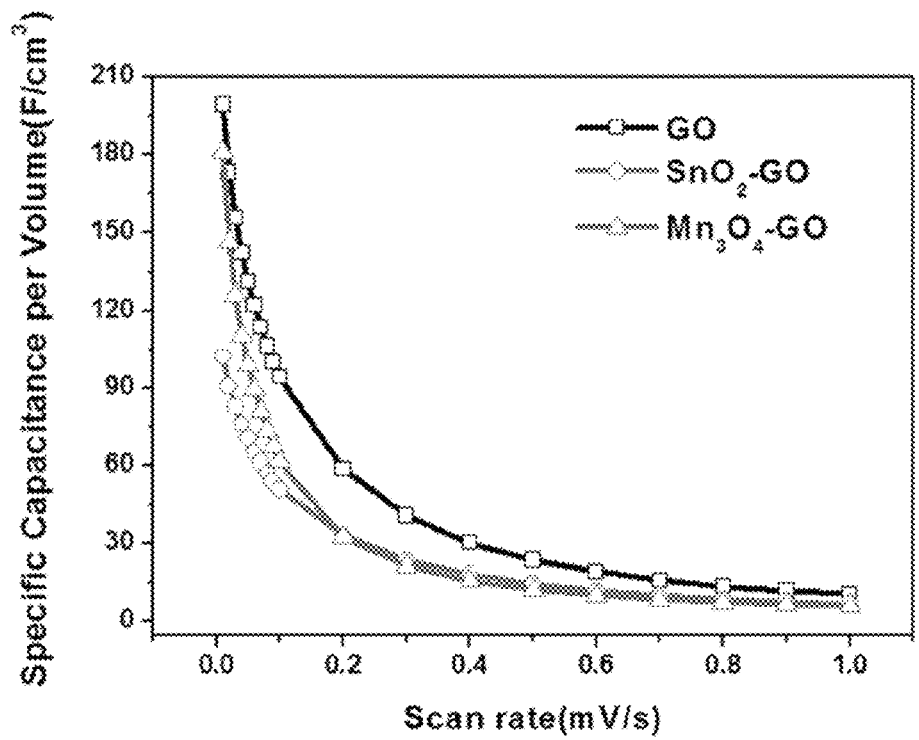
FIG. 30 illustrates a graph for changes in SC values per weight depending on an increase in the scan rate of the devices of Example and Comparative Example.

FIG. 30 illustrates a graph for changes in SC value per weight depending on an increase in the scan rate of each device.

Even at a high scan rate, the properties of the device made of $Mn_3O_4$-GO composite were superior to those of the device made of $SnO_2$-GO composite.

Figure 31:
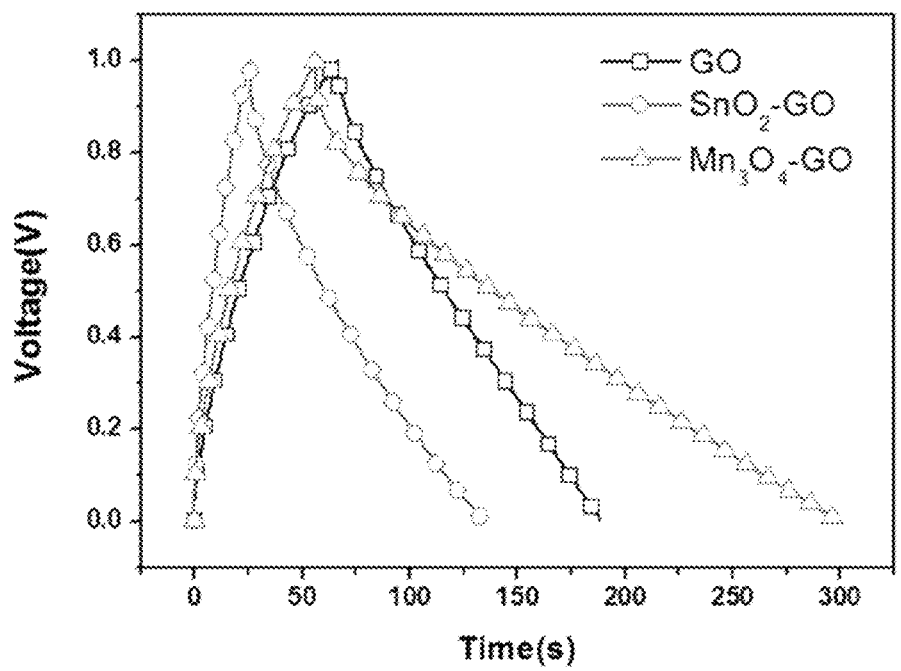
FIG. 31 illustrates a graph for constant current charge/discharge at 0.5 A/g for the devices of Example and Comparative Example.

FIG. 31 illustrates a graph for constant current charge/discharge at 0.5 A/g of each device.

As illustrated in the graph, the SC value is increased in the sequence of graphene oxide electrode, $Mn_3O_4$-GO composite electrode, and $SnO_2$-GO composite electrode. This is the same as the tendency of SC value per weight.

Figure 32:
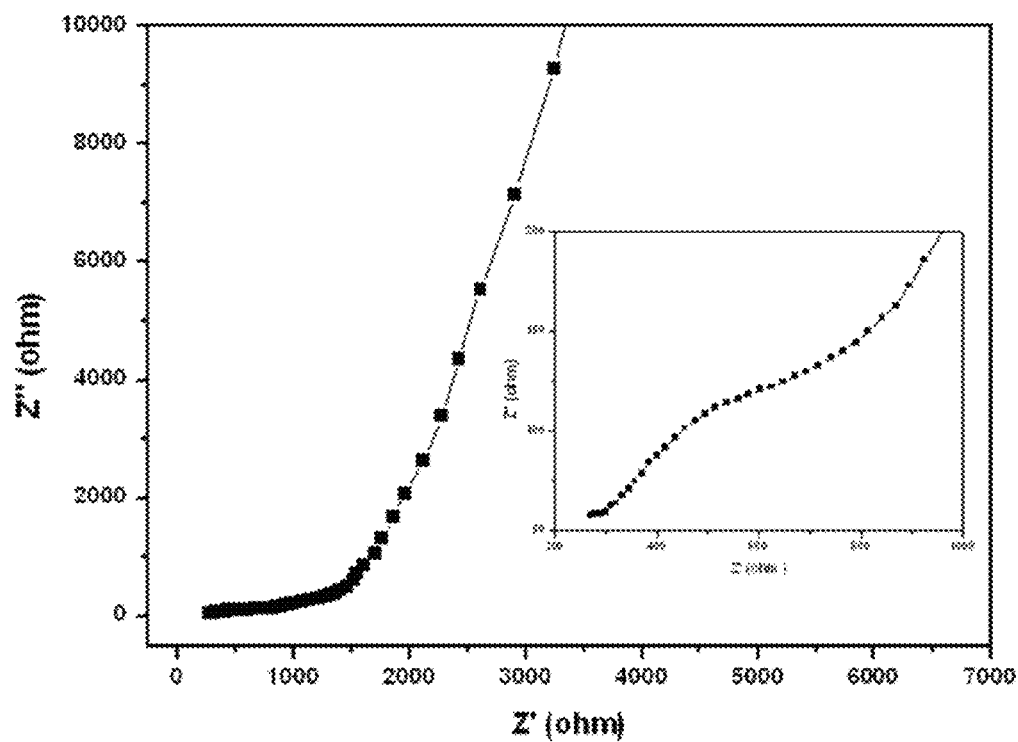
FIGS. 32 to 34 illustrate the results of measurement of electrochemical impedance spectroscopy (EIS) for the devices of Example and Comparative Example.
Figure 33:
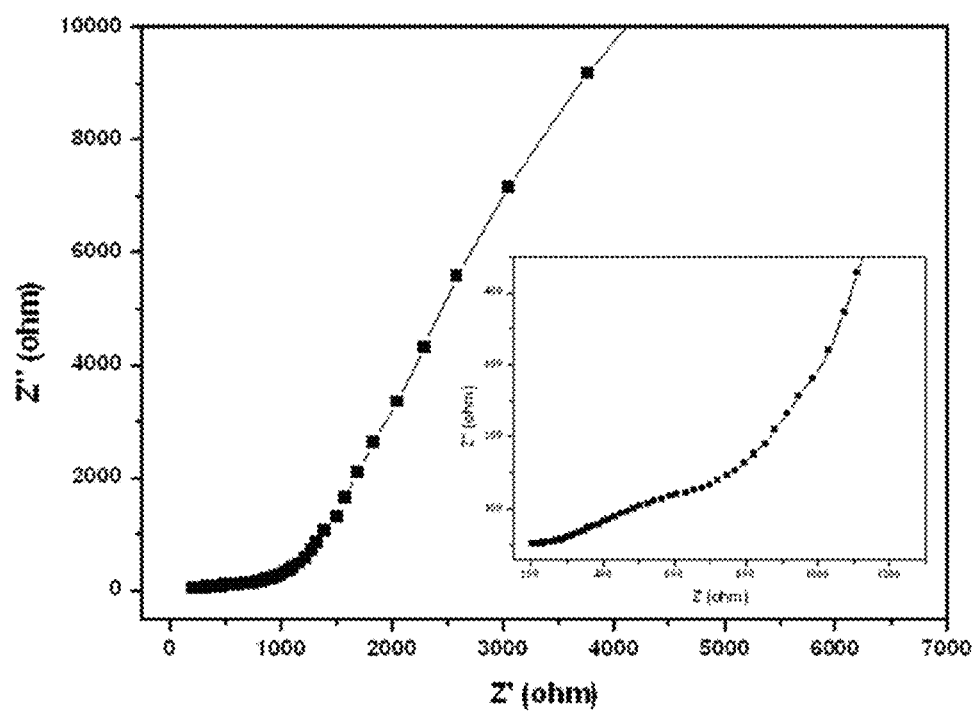
Figure 34:
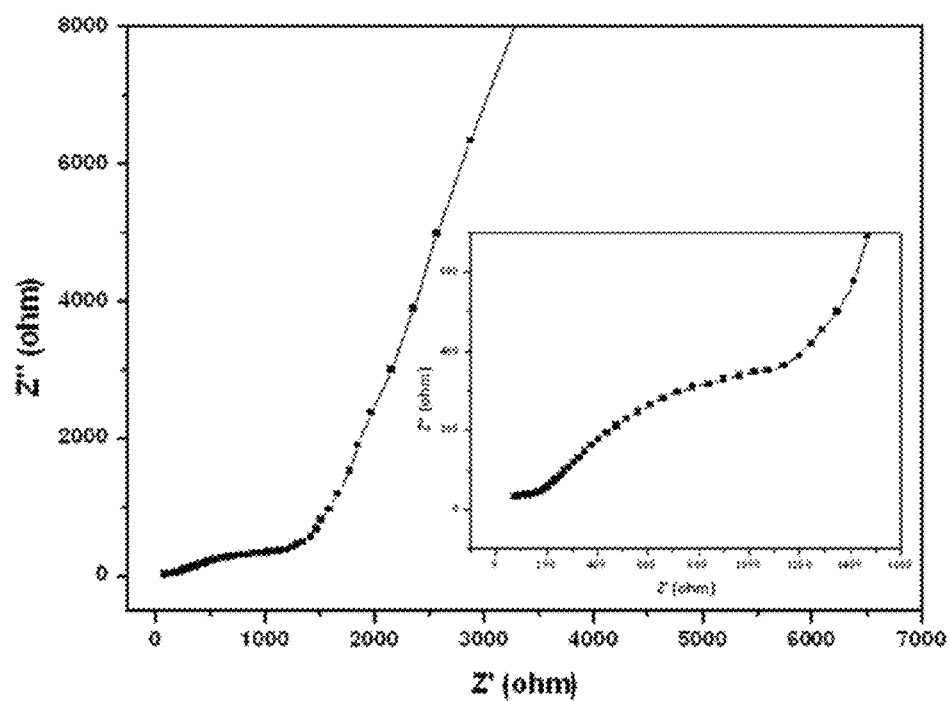

FIGS. 32 to 34 illustrate the results of measurement of electrochemical impedance spectroscopy (EIS) for each device.

EIS was performed under a serial bias condition of 0 V at a sinusoidal signal of 10 my in the range of 10 mHz to 500 kHz. Based on the results of measurement of EIS, the resistance of each device could be measured. Respective inner graphs show enlarged graphs of the low frequency range.

As described hereinbefore, the graphene oxide solution is mixed with the metal oxide precursor solution, collected on a membrane filter via vacuum filtration, and then thermally treated, and thereby metal oxide is synthesized to the functional group of graphene oxide. Thus, even when a surfactant is not used and high temperature and high pressure are not applied from the outside, metal oxide nanoparticles are uniformly distributed, giving a graphene oxide-metal oxide composite having a layered structure. The supercapacitor having an in-plane structure using the graphene oxide-metal oxide composite thus prepared may exhibit superior performance, compared to conventional supercapacitors having an in-plane structure using only graphene oxide. Consequently, the graphene oxide-metal oxide composite according to the present invention is appropriate for use as an electrode material for a supercapacitor, especially an electrode material for a supercapacitor having an in-plane structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, it will be understood that the scope of the present invention is interpreted by the following claims, and also that all technical ideas within the ranges equivalent thereto are included in the scope of the present invention.

What is claimed is:

1. A block supercapacitor, comprising:
   two or more unit cells, each unit cell comprising two electrodes, the electrodes each composed of a material having a layered structure and disposed to face each other in an in-plane structure in which the layered structure of the material of each electrode is exposed on each facing surface of the two electrodes and wherein an electrolyte is filled in a space between the facing surfaces of the two electrodes, and at least one metal wall formed on a space between the two or more unit cells to confine the electrolyte filled in the space between the facing surfaces of the two electrodes within the respective unit cell;
   wherein the two or more unit cells are arranged adjacent to each other respectively and are connected in series by a connector; and
   wherein the material having the layered structure is configured such that graphene oxide layers are laminated into the layered structure and metal oxide nanoparticles are dispersed between the graphene oxide layers, and the metal oxide nanoparticles comprise $SnO_2$ or $Mn_3O_4$.

2. The block supercapacitor of claim 1, wherein the connector comprises a metal material and is formed between the electrodes arranged adjacent to each other of the two or more unit cells.

3. The block supercapacitor of claim 1, wherein two electrodes of each of the unit cells are separated via patterning in any one shape selected from among an interdigitated shape, a straight shape, and a zigzag shape.

4. A method of manufacturing the supercapacitor of claim 1, comprising:
   forming an electrode member composed of the material having the layered structure on a surface of a substrate, wherein the material having the layered structure is configured such that graphene oxide layers are laminated into the layered structure and metal oxide nanoparticles are dispersed between the graphene oxide layers, and the metal oxide nanoparticles comprise $SnO_2$ or $Mn_3O_4$;
   separating the electrode member into two or more cell members;
   forming the connector comprising a metal material in a space between the cell members;
   filling the space between the cell members with a metal, thus forming the metal wall;
   separating each of the separated cell members into two electrodes, thus each of the cell members forming unit cells, and
   placing the electrolyte between the two electrodes in each of the unit cells,
   wherein the electrodes of the unit cells adjacent to each other are electrically connected in series by the connector.

5. The method of claim 4, wherein forming the metal wall is performed using any one process selected from among thin film deposition, plating, screen printing, casting, and film/plate/block attachment.

6. The method of claim 4, further comprising forming a polymer coating for covering the electrode member, before separating the electrode member into the cell members.

7. The method of claim 4, further comprising forming current collectors at both sides of the electrode member, after forming the electrode member.

8. The method of claim 7, further comprising reinforcing contact portions between the electrode member and the current collectors via metal plating.

9. The method of claim 4, wherein forming the unit cells is performed by patterning the cell members using any one process selected from among optical patterning, mechanical patterning, chemical etching, and imprinting, thus forming two separated electrodes.

10. The method of claim 4, further comprising chemically reducing the separated electrodes of the unit cells.

11. The method of claim 10, wherein chemically reducing the separated electrodes is performed using any one process selected from among exposure to a reducing gas, immersion in a reducing agent-containing aqueous solution, thermal treatment, microwave treatment, and optical treatment.

12. The method of claim 4, further comprising introducing a functional group to the separated electrodes of the unit cells to obtain a pseudocapacitive effect.

13. The method of claim 12, wherein introducing the functional group is performed by subjecting the separated electrodes to any one process selected from among immersion in a KOH solution, plasma treatment, optical treatment, and chemical synthesis.

14. A method of preparing a composite for use in electrode of the supercapacitor of claim 1, comprising:
   preparing a graphene oxide solution;
   preparing a metal oxide precursor solution;
   mixing the graphene oxide solution with the metal oxide precursor solution;
   filtering the mixed solution via vacuum filtration using a membrane filter; and
   reducing a filtered material, thus obtaining the composite constituting the material having the layered structure;
   wherein the metal oxide precursor solution is a Sn oxide precursor solution or a Mn oxide precursor solution, and
   wherein the Sn oxide precursor solution is obtained by dissolving $SnCl_2.2H_2O$ in HCl and the Mn oxide precursor solution comprises a $MnCl_2.4H_2O$ aqueous solution and a $KMnO_4$ aqueous solution.

15. The method of claim 13, wherein mixing is performed by adding the metal oxide precursor solution dropwise to the graphene oxide solution.

* * * * *